Nov. 2, 1954    L. E. BRAYMER    2,693,032
TELESCOPE MOUNTING
Filed March 15, 1949
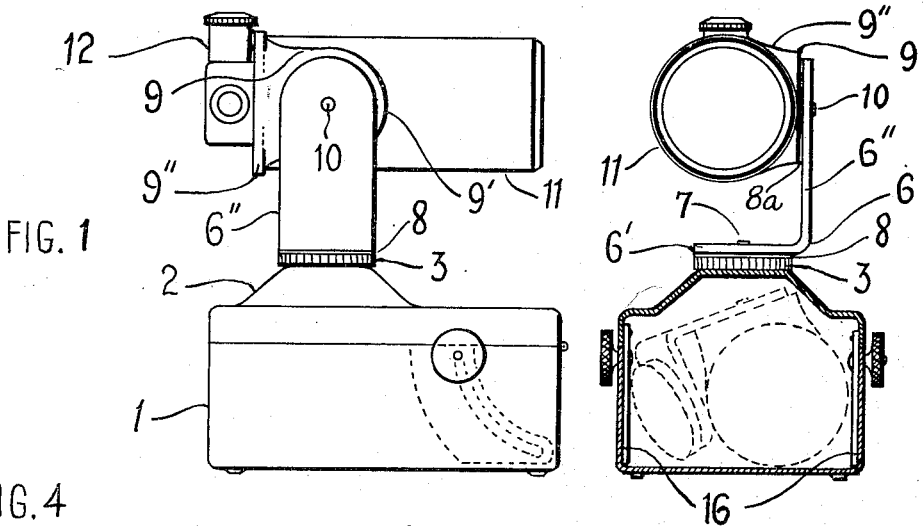
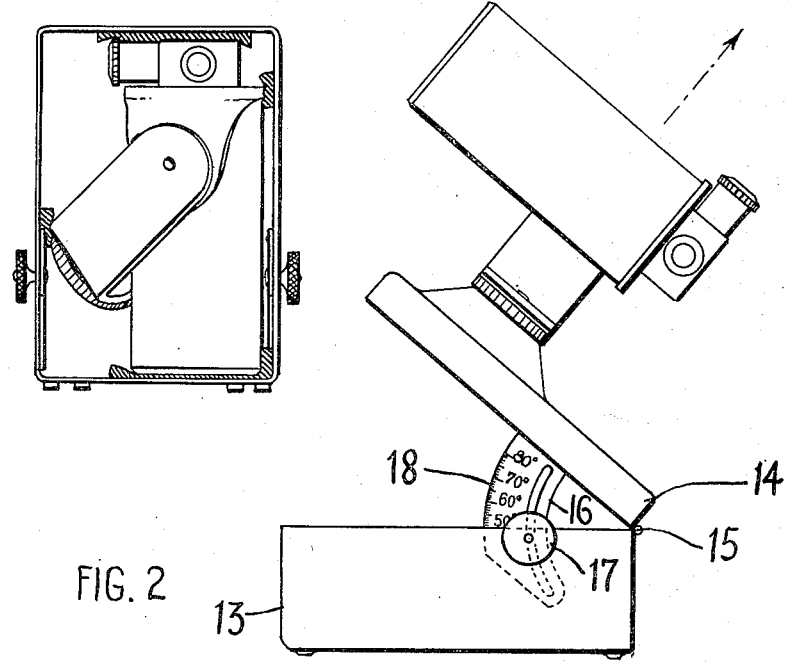
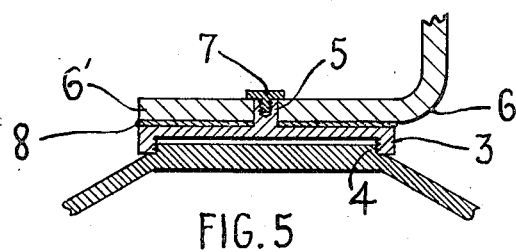
INVENTOR.
LAWRENCE E. BRAYMER
BY
His Attorney

United States Patent Office 2,693,032
Patented Nov. 2, 1954

2,693,032

TELESCOPE MOUNTING

Lawrence E. Braymer, Lahaska, Pa.

Application March 15, 1949, Serial No. 81,523

4 Claims. (Cl. 33—61)

My invention relates to telescopes, and particularly to a portable telescope having a hollow base providing a housing for fragile parts of the instrument, such as the tube containing the optical system and mounting elements for the tube. The base is provided with a tiltable closure which forms a shield for the housed fragile parts and also provides a stable footing or foundation for the tube and mounting elements so as to permit their use in making azimuth altitude observations or for use as an equatorial telescope without danger of tilting.

In a preferred embodiment of my invention, the closure or lid is hinged to one end of the base and may be bulged outward to form a hollow conoidal pedestal remote from the hinge.

The tube mounting elements include a pair of rotors or turntables, one of which is connected with the summit of the pedestal and is rotatable thereon about an axis. When the base is positioned horizontally and the lid is closed, this axis of rotation is positioned vertically and permits the tube to be turned horizontally for the measurement of azimuth. By appropriately tilting the lid, this axis of rotation is inclined to permit movement of the tube for measuring right ascension or permit use of the instrument as an equatorial telescope. This axis may therefore be appropriately designated the azimuth-right ascension axis, and the turntable, which rotates about such axis, may be deemed the azimuth-right ascension element of the telescope mounting.

The second turntable or rotor is mounted on the first turntable and supports the telescope barrel. The second turntable is rotatable about a horizontal axis which is transverse to the azimuth-right ascension axis, and forms an axis of oscillation for the telescope barrel to permit the measurement of altitude or declination. This axis may be appropriately designated the altitude-declination axis, and the second turntable may be appropriately designated an altitude-declination element. The telescope barrel contains optical elements having an optical axis transverse to the altitude-declination axis and the barrel may be rotated about its optical axis on the altitude-declination element.

When the instrument is used as an equatorial telescope, the altitude declination axis is positioned parallel to the axis of the lid hinge and the lid is tilted to position the azimuth-right ascension axis parallel with the polar axis of the earth. This may be readily done by aligning the principal optical axis of the instrument with the azimuth-right ascension axis and tilting the lid until these aligned axes are directed at a celestial object, such as the star Polaris. The angle of elevation of the lid to the horizontal will then indicate the approximate terrestrial latitude of the situs of the instrument.

The positioning the azimuth-right ascension axis remote from the hinge axis results in the elevation of the eye-piece of the instrument into convenient viewing position when the lid is tilted and also moves the center of gravity of the tube and mounting elements toward the center of the base.

The principles and further advantages of my invention will further appear from the following description of the best mode in which I have contemplated applying such principles, and the accompanying drawing in illustration thereof.

In the drawings, Fig. 1 is a side elevation of my improved instrument in an altitude-azimuth general purpose position; Fig. 2 is a side elevation of the instrument in polar-equatorial position; Fig. 3 is a vertical sectional view taken adjacent to the hinge of the base and showing in dotted lines the position of the barrel and mounting elements when detached from and housed within the base; Fig. 4 is a horizontal sectional view showing in full lines the barrel and mounting elements detached from and housed within the base; and Fig. 5 is an enlarged fragmentary sectional view showing the coupling between the base and one of the mounting elements.

As illustrated in the drawings, my invention comprises, in its preferred form, a base, whose top is bulged outwardly to form a conoidal protuberance 2 providing a support for a coupling ring 3 which is threaded to the top 4 of the conoidal protuberance.

The coupling ring 3 is provided with a central boss or journal 5 on which is swiveled an L-shaped bracket or turntable 6. A screw 7 is threaded into the boss 5 and has a head overlapping the base 6' of the turntable to press it lightly against a friction disk 8 carried by the coupling ring 3 so as to permit the controlled rotation of the turntable about the axis of the boss 5.

The turntable 6 has an arm 6'' extending at right angles to its broad base 6'. An L-shaped bracket or turntable 9 has its base 9' pivotally connected by a journal 10 with the upper portion of the bracket arm 6''. A friction disk 8a is interposed between the broad bearing surfaces formed by the members 6'' and 9'' so as to permit controlled rocking of the bracket 9 on the bracket 6 on an axis transverse to the axis of rotation of the bracket 6.

The bracket 9 has an arm 9'' which extends at right angles to the base 9' and contains an opening in which is journalled the barrel 11 of a telescope having an eye-piece 12. The optical system contained in the barrel has its principal optical axis aligned with the axis of the barrel and is preferably of the Maksutov-Cassegrain or the Maksutov-Gregorian types, such, for instance, as illustrated in my applications, Serial No. 787,995, filed November 25, 1947, now Patent No. 2,670,656 granted March 2, 1954, and Serial No. 33,320, filed January 16, 1948, now Patent No. 2,649,791 granted August 25, 1953.

The base 1 preferably consists of a hollow case 13 and a lid 14 pivotally connected with the case 13 by a hinge 15. The lid may be fixed in angularly adjustable relation to the case 13 by slotted ears 16 depending from the lid 14 and clamps 17 journalled in the side walls of the case 13. The ears 16 are provided with graduations 18 which form a scale indicative of the latitude of the situs of the instrument when the optical axis is aligned with the azimuth-right-ascension axis and directed at Polaris.

When the instrument is to be used for azimuth-altitude observations, the lid 14 is positioned horizontally and the barrel may be turned about the vertical axis through the stud 5 and about the horizontal axis through the trunnion 10.

When the instrument is to be used as an equatorial telescope in a known latitude, the base 13 is horizontally positioned and the lid 14 is tilted until the known latitude is shown by the scale 18 in juxtaposition to the datum formed by the top edge of the case. The lid is then secured by the clamps 17 and the tube may be turned about the axis through the trunnion 10 to point to a desired celestial point and then turned on the axis through the stud 5 to sweep a celestial circle (parallel with the celestial equator) passing through such point.

Where the terrestrial latitude of the situs of the instrument is unknown, the instrument may be adjusted by aligning the optical axis with the axis through the stud 5 and tilting the lid until the optical axis is directed at Polaris as above described. When the proper tilt is thus determined, the lid is secured at such angle by the clamps 17 and the tube turned about the several axes as above described.

When the instrument is to be packed, stored or carried, the coupling ring 3 is unscrewed from the base 4 and the arm 6'' turned on the trunnion 10 until the base 6' engages the periphery of the barrel 11. In this collapsed condition, the barrel and mounting elements fit in the cushioned seat in the case 13 with the connected sections of the members 6'' and 9' projecting into the hollow bulge 2 and the lid is closed thereover.

Having described my invention, I claim:

1. An optical instrument comprising a hollow case having a tiltable lid with a bulged section tapering upwardly to form an imperforate seat having a threaded periphery, a coupling ring screwed on said threaded periphery, a bracket pivotally connected with said coupling ring and having an axis of rotation concentric with said threaded periphery and an arm parallel with such axis, a bracket pivotally connected with said arm and having an axis of rotation transverse to the axis of rotation of said first bracket, said second bracket having an arm parallel to the axis of said second bracket and a telescope having a barrel rotatably journalled in the arm of said second bracket and an eye piece adjacent thereto and extending transversely to the axis of said barrel, the axis of rotation of said second bracket being nearer to the eye piece end of said barrel than to the light receiving end thereof.

2. An optical instrument comprising a hollow base, a tiltable closure pivotally connected with one end of said base and forming therewith a housing, means for adjusting and securing said closure at varying angles of tilt to said base, a tilt indicator indicating the angle of tilt of said closure to said base, a bracket demountably mounted exteriorly of said closure and rotatable thereon about an axis, said bracket having an arm projecting outwardly from said closure parallel with said axis and offset from said axis, a second bracket connected with said arm and rotatable thereon about an axis normal to first named axis, said second bracket having an arm extending parallel to and spaced from said second axis, a hollow barrel connected with said second bracket and having an axis normal to said second arm, said barrel having a light receiving aperture in the end thereof opposite to said second arm, a telescopic optical system in said barrel and having its optical axis aligned with the axis of the barrel, and an eye piece adjacent to said second arm and extending transversely of said barrel, said closure being tiltable to align the axis of rotation of said first bracket with Polaris in different latitudes and permitting equatorial observation of a desired celestial object by adjusting said second bracket about its axis and turning said first bracket about its axis.

3. An optical instrument comprising a hollow base, a tiltable closure pivotally hinged to said base at one end of said closure and forming therewith a housing, a bracket demountably mounted exteriorly of said closure and rotatable thereon about an axis nearer to the tilting end of said closure than to the hinged end thereof, said bracket having an arm projecting outwardly from said closure parallel with and offset from said axis, a second bracket connected with said arm and rotatable thereon about an axis and substantially vertically above the same when the closure is closed and its axis of hinging and the axis of the second bracket are parallel normal to said first named axis, said second bracket having an arm extending parallel to and spaced from said second axis, a hollow barrel mounted on said second arm and having its axis extending radially of said second axis, said barrel having a light receiving aperture in the end thereof remote from said second arm.

4. An optical instrument comprising a hollow base and a tiltable closure pivotally hinged to said base, a bracket rotatable on said closure about an axis, said bracket having an arm projecting outwardly from said closure parallel with and offset from said axis, a second bracket connected with said arm and rotatable thereon about an axis normal to said first named axis, said second bracket having an arm extending parallel and spaced from said second axis, a hollow barrel rotatably mounted on said second arm and rotatable about an axis extending radially of said second axis, said barrel having a light receiving aperture in the end thereof remote from said second arm, and an eye piece extending transversely to the axis of rotation of said barrel and lying on the opposite side of said second arm from said light receiving aperture.

References Cited in the file of this patent

UNITED STATES PATENTS

| Number | Name | Date |
| --- | --- | --- |
| 583,518 | Stoller | June 1, 1897 |
| 658,611 | Bausch | Sept. 25, 1900 |
| 690,008 | Berger | Dec. 31, 1901 |
| 917,799 | Saegmuller | Apr. 13, 1909 |
| 1,749,012 | Willson | Mar. 4, 1930 |
| 2,326,552 | Morse | Aug. 10, 1943 |
| 2,423,282 | Aubey | July 1, 1947 |

FOREIGN PATENTS

| Number | Country | Date |
| --- | --- | --- |
| 1,112 | Great Britain | Dec. 30, 1775 |